US010338397B1

(12) United States Patent
Seo et al.

(10) Patent No.: US 10,338,397 B1
(45) Date of Patent: Jul. 2, 2019

(54) VEHICLE HEAD-UP DISPLAY DEVICE AND CONTROL METHOD THEREOF

(71) Applicant: HYUNDAI MOBIS Co., Ltd., Seoul (KR)

(72) Inventors: Jung Hoon Seo, Seoul (KR); Chan Young Yoon, Gwangmyeong-si (KR); Sang Hoon Han, Seoul (KR); Jae Ho Oh, Yongin-si (KR); Young Hoon Han, Suwon-si (KR); Myung Rae Lee, Hwaseong-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 15/956,364

(22) Filed: Apr. 18, 2018

(51) Int. Cl.
*G02B 27/01* (2006.01)
*B60K 37/00* (2006.01)
*B60K 35/00* (2006.01)

(52) U.S. Cl.
CPC .......... *G02B 27/0179* (2013.01); *B60K 35/00* (2013.01); *G02B 27/0101* (2013.01); *B60K 2370/334* (2019.05); *B60K 2370/52* (2019.05); *G02B 2027/0141* (2013.01); *G02B 2027/0181* (2013.01); *G02B 2027/0183* (2013.01); *G02B 2027/0194* (2013.01); *G02B 2027/0196* (2013.01)

(58) Field of Classification Search
CPC ........ G02B 27/0101; G02B 2027/0112; G02B 27/0179; G02B 2027/0183; G02B 2027/0194; G02B 2027/0196; B60K 37/02; B60K 37/00; B60K 2350/2052; B60K 2350/352
See application file for complete search history.

(56) References Cited

U.S. PATENT DOCUMENTS

| 9,274,336 | B2 | 3/2016 | Deubzer et al. |
| 9,678,340 | B2 | 6/2017 | Kanamori |
| 10,088,680 | B2 | 10/2018 | Beraud et al. |
| 10,120,188 | B2 | 11/2018 | Matsuzaki et al. |
| 2005/0040940 | A1 | 2/2005 | Sonobe |
| 2014/0320973 | A1 | 10/2014 | Deubzer et al. |

(Continued)

FOREIGN PATENT DOCUMENTS

| DE | 10 2013 001 380 A1 | 7/2014 |
| DE | 11 2014 000 528 T5 | 10/2015 |

(Continued)

OTHER PUBLICATIONS

Office Action of corresponding German Patent Application No. 10 2018 2016 021.5—10 pages (dated Jan. 14, 2019).

*Primary Examiner* — Ryan D Howard
(74) *Attorney, Agent, or Firm* — Knobbe Martens Olson & Bear LLP (57) ABSTRACT

Provided is a vehicle head-up display (HUD) device including a display unit divided into a first display area and a second display area; a folding mirror configured to reflect a first image to the first display area; a picture generation unit (PGU) configured to directly project the first image to the folding mirror; and a control unit configured to adjust a projection distance and a magnification and control the PGU to output the first image to the first image area and to output a second image to the second display area. Here, the first image is an virtual image, and the second image is an real image.

14 Claims, 6 Drawing Sheets

(56) References Cited

U.S. PATENT DOCUMENTS

| | | |
|---|---|---|
| 2015/0268466 A1 | 9/2015 | Kanamori |
| 2016/0062113 A1* | 3/2016 | El-Ghoroury ...... G02B 27/0101 345/647 |
| 2016/0121895 A1* | 5/2016 | Seo ...................... B60W 30/18 701/70 |
| 2016/0377862 A1* | 12/2016 | Zimmerman ...... G02B 27/0101 359/567 |
| 2017/0307885 A1 | 10/2017 | Beraud et al. |
| 2017/0329143 A1 | 11/2017 | Svarichevsky et al. |
| 2017/0357088 A1 | 12/2017 | Matsuzaki et al. |
| 2018/0024357 A1 | 1/2018 | Yamamoto |
| 2018/0067308 A1 | 3/2018 | Sakai |
| 2018/0178650 A1 | 6/2018 | Fujita |
| 2018/0350236 A1 | 12/2018 | Yamaguchi et al. |
| 2018/0367769 A1 | 12/2018 | Greenberg |

FOREIGN PATENT DOCUMENTS

| | | |
|---|---|---|
| JP | 64-37735 U1 | 3/1989 |
| JP | 10-293264 A | 11/1998 |
| JP | 11-119147 A | 4/1999 |
| JP | 2005-149175 A | 6/2005 |
| JP | 2006-347451 A | 12/2006 |
| JP | 2015-502569 A | 1/2015 |
| JP | 2015-054628 A | 3/2015 |
| JP | 2015-075350 A | 4/2015 |
| JP | 2016-037187 A | 3/2016 |
| JP | 2016-101805 A | 6/2016 |
| JP | 2016-151566 A | 8/2016 |
| JP | 2017-097153 A | 6/2017 |
| JP | 2018-501510 A | 1/2018 |
| JP | 2018-017750 A | 2/2018 |
| JP | 2018-041849 A | 3/2018 |
| JP | 2018-538573 A | 12/2018 |
| WO | 2017/047132 A1 | 3/2017 |
| WO | 2017/061026 A1 | 4/2017 |
| WO | 2017/138527 A1 | 8/2017 |
| WO | 2017/163288 A1 | 9/2017 |
| WO | 2018/042844 A1 | 3/2018 |
| WO | 2018/056112 A1 | 3/2018 |

* cited by examiner

VEHICLE HEAD-UP DISPLAY DEVICE AND CONTROL METHOD THEREOF

BACKGROUND

1. Field of the Invention

The present invention relates to a vehicle head-up display device and a control method thereof.

2. Discussion of Related Art

Recently, as vehicles equipped with a head-up display, also known as an HUD, have been introduced, users interests in this device have been increasing.

Such an HUD device is a device that provides vehicle operation information such as driving information or navigation information of a vehicle without departing from a driver's front view, that is, a driver's main viewing line while the driver is operating a car or an aircraft. An initial HUD device was developed so that the device is to be attached to an aircraft, in particular, a fighter aircraft to provide flight information to a pilot while the aircraft is flying. A vehicle HUD device was developed by applying such a principle to a vehicle.

For example, when a vehicle is driven at 100 km/h, it may take about two seconds for a driver to look at a dashboard and then turn his or her gaze to a road. Under this assumption, the vehicle moves about 55 m, and thus there is always the possibility of an accident.

In order to reduce the danger, a vehicle HUD that enables a driver to perceive important operation information or route information of a vehicle without requiring the driver to look away from a road while driving by displaying dashboard information (speed, mileage, RPM, and the like) on the driver's main viewing line.

Meanwhile, an HUD device according to conventional technology displayed operation information in a driver's front view in an overlapping manner depending on the driver's eye level. In this case, when a height at which the operation information was to be displayed was changed within the driver's viewing range, the operation information was displayed without the perspective of an actual view being considered.

Figure 1A:
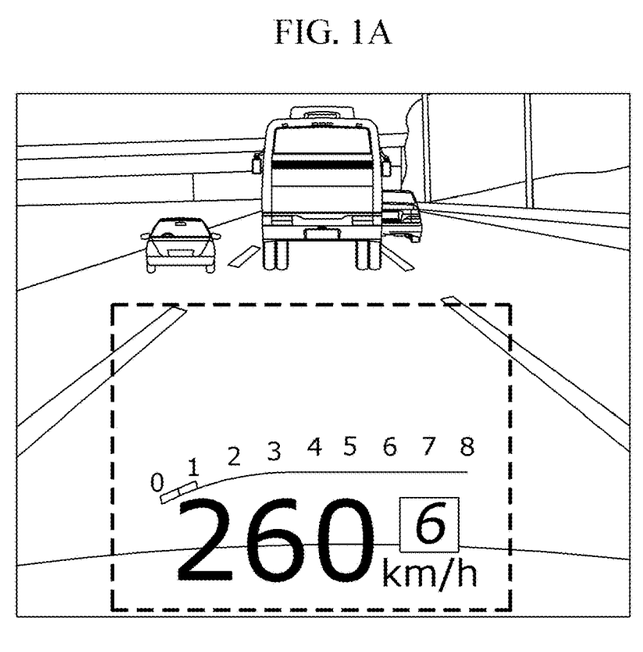
FIGS. 1A to 1C illustrate a head-up display device according to a conventional technology.
Figure 1B:
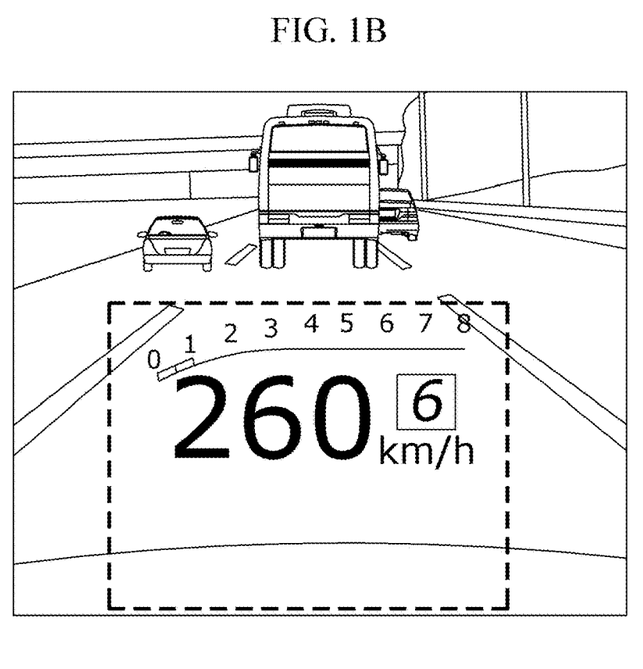
Figure 1C:
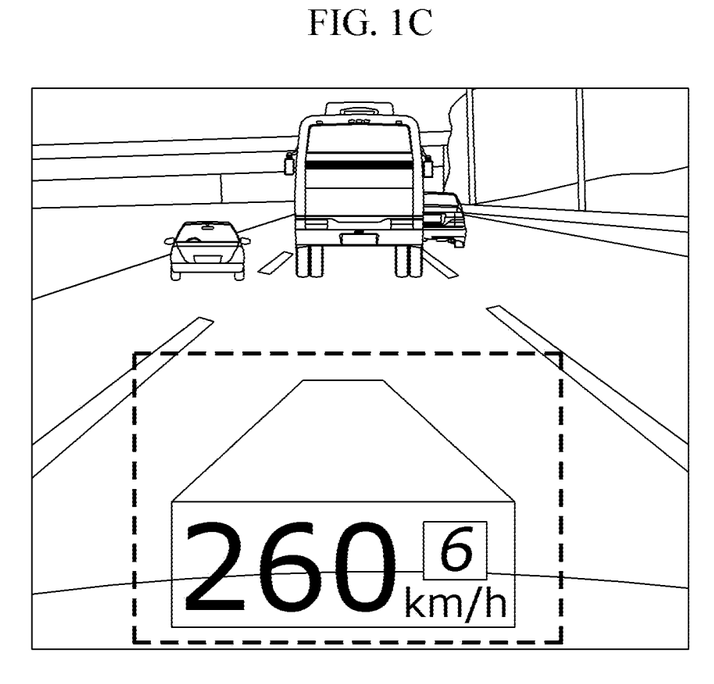

FIG. 1A to FIG. 1C illustrate an HUD device according to conventional technology.

A conventional HUD device used a single picture generation unit (PGU). When a plurality of pieces of operation information were displayed, such a single PGU had a problem of a limited display area due to limitation of a driver's viewing angle caused by a single projection distance (focus) and a single magnification. Therefore, according to the conventional technology, main information image should be reduced or moved in order to display a variety of content.

In this case, when the height of the operation information displayed in a lower end part, as shown in FIGS. 1A and 1B, is vertically moved in a Y-axis direction, it is possible for there to be a partial blocking of the driver's front view.

Also, a driver's focal distance varies depending on speed. However, according to the conventional technology shown in FIG. 1C, an HUD image is displayed at a fixed focal distance, and thus the driver's focal distance may be different from the focal distance of the HUD image. Accordingly, it is possible for there to be an interference with driving.

In this regard, Korean Patent Publication No. 10-2009-0075997, entitled "vehicle head-up display device," discloses a technique for increasing a driver's visible area with respect to an HUD to enable the driver to easily view driving information by including a panel of a greater resolution than that of an input image source.

SUMMARY OF THE INVENTION

An embodiment of the present invention provides a vehicle head-up display device configured to enable a driver to perceive vehicle information with minimal eye movement during driving by distinguishing areas displayed on a display unit by content and displaying content information for each of the distinguished areas, and a control method thereof.

However, the technical objects of embodiments of the present invention are not limited to the aforesaid, and there may be other technical objects.

According to a first aspect of the present invention, a vehicle head-up display (HUD) device includes a display unit divided into a first display area and a second display area; a folding mirror configured to reflect a first image to the first display area; a picture generation unit (PGU) configured to directly project the first image to the folding mirror; and a control unit configured to adjust a projection distance and a magnification and control the PGU to output the first image to the first image area and to output a second image to the second display area. In this case, the first image is an virtual image, and the second image is an real image.

The display unit is formed by depositing an organic light-emitting diode (OLED) panel on a transparent glass. In this case, an area of the transparent glass in which the OLED panel is not deposited may correspond to the first display area, and an area of the transparent glass in which the OLED panel is deposited may correspond to the second display area.

The OLED panel may be deposited on one and more lower end parts and side surface parts of the transparent glass.

The control unit may correct distortion of the first image and then perform a control operation to output the first image to the first display area.

The control unit may adjust a projection distance and a magnification corresponding to a vehicle's speed and perform a control operation to output the first image to the first display area. The projection distance and the magnification corresponding to the vehicle's speed may be stored as a lookup table in a memory.

The first image may include one or both of driving route information and speed information of a vehicle, and the second image may include one or more of an image captured by an external camera, vehicle warning information displayed in a cluster, auxiliary information of the driving route information, and auxiliary information of the speed information.

According to a second aspect of the present invention, a method of controlling a vehicle head-up display device including a display unit divided into a first display area and a second display area, the method being performed by a control unit, includes receiving a viewing angle corresponding to a head motion and an eye box of a driver; adjusting a magnification according to a projection distance and the viewing angle and performing a control operation to output a first image to the first display area; and performing a control operation to output a second image to the second display area, wherein the first image is an virtual image, and the second image is an real image.

According to any one of the aforementioned technical solutions of the present invention, it is possible to provide a variety of vehicle information to a driver with minimal eye movement by additionally including a transparent auxiliary display that outputs a short-distance real image.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. Further, in order to clearly illustrate the present invention, parts not related to the description are omitted in the drawings.

When one part is referred to as "comprising" (or "including" or "having") other elements, it should be understood that the part can comprise (or include or have) only those elements or other elements as well as those elements unless specifically described otherwise.

The present invention relates to a vehicle head-up display device 100.

According to an embodiment of the present invention, by distinguishing areas displayed on a display unit 110 by content, and displaying content information for each of the distinguished areas, it is possible for a driver to perceive vehicle information with minimal eye movement during driving.

The vehicle head-up display device 100 according to an embodiment of the present invention will be described below with reference to FIGS. 2 to 6.

Figure 2:
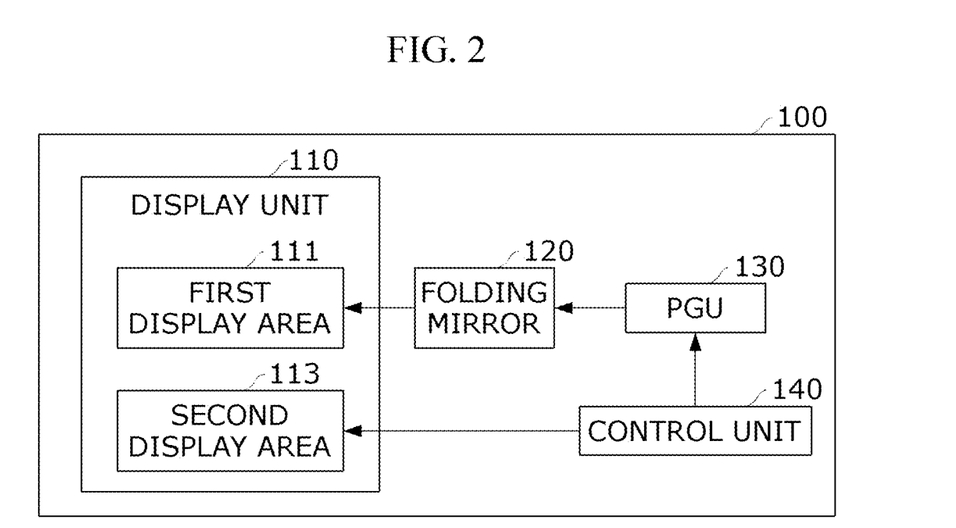
FIG. 2 is a block diagram showing a vehicle head-up display device according to an embodiment of the present invention.

FIG. 2 is a block diagram showing the vehicle head-up display device 100 according to an embodiment of the present invention.

The vehicle head-up display device 100 according to an embodiment of the present invention includes a display unit 110, a folding mirror 120, a PGU 130, and a control unit 140.

The display unit 110 has a first display area 111 and a second display area 113 distinguished from each other. A first image is displayed in the first display area 111, and a second image is displayed in the second display area 113.

In this case, the first image is an virtual image reflecting a focal distance that a driver looks at according to a vehicle speed, and the second image is an real image.

According to an embodiment of the present invention, it is possible for a driver in a traveling vehicle to perceive vehicle information in an optimal state by separately providing the vehicle information to the first display area 111 in which an virtual image is displayed and the second display area 113 in which an real image is displayed.

Figure 3:
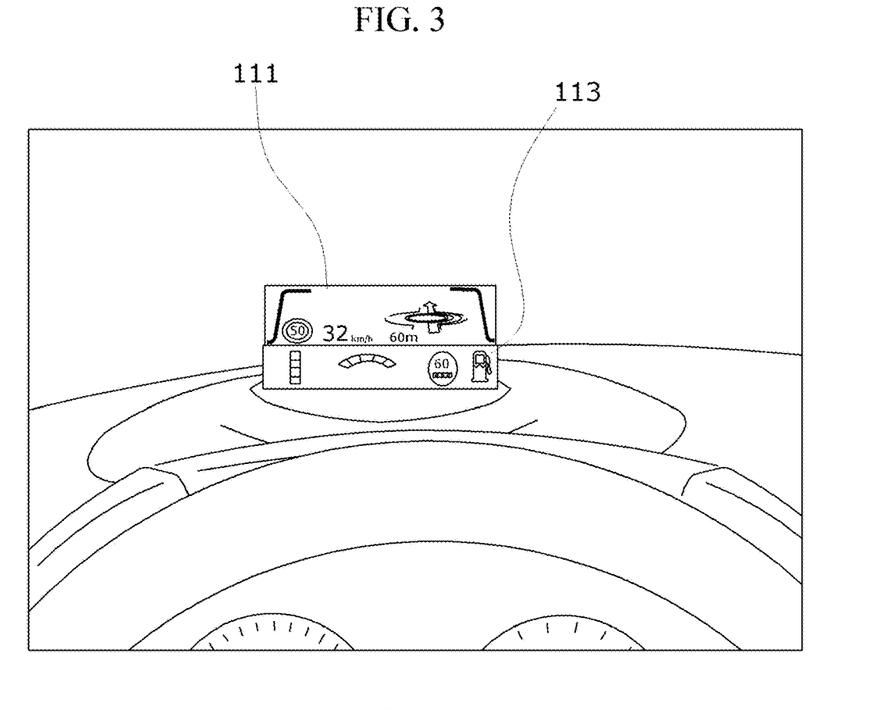
FIG. 3 illustrates first and second display areas of a display unit.
Figure 4A:
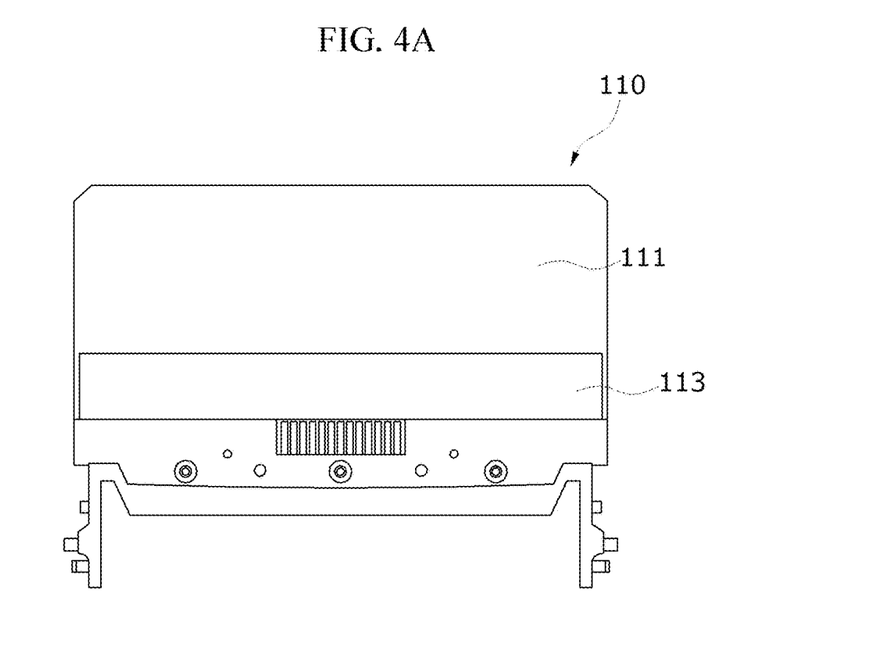
FIGS. 4A and 4B are example diagrams in which a display unit is implemented.
Figure 4B:
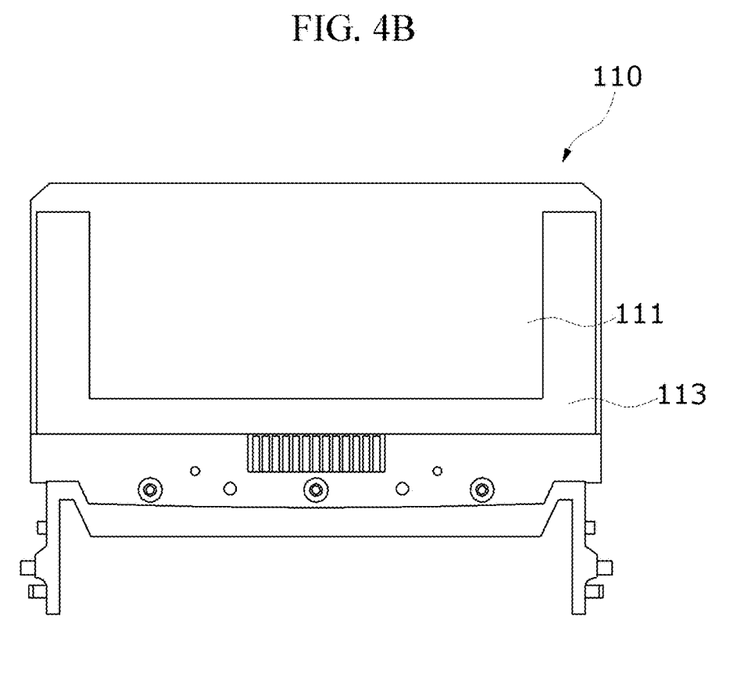

FIG. 3 illustrates the first display area 111 and the second display area 113 of the display unit 110. FIGS. 4A and 4B are example diagrams in which the display unit 110 is implemented.

Referring to FIG. 3, the display unit 110 may be formed by combining a transparent auxiliary display with a combiner mirror.

For example, the display unit 110 may be formed by depositing an organic light-emitting diode (OLED) panel on a transparent glass. In this case, an area of the transparent glass in which the OLED panel is not deposited may correspond to the first display area 111, and an area in which the OLED panel is deposited may correspond to the second display area 113.

The OLED panel may be deposited on one or more lower end parts and side surface parts of the transparent glass.

That is, the OLED panel corresponding to the second display area 113 may be deposited on only a lower end part of the transparent glass as shown in FIG. 4A, or may also be deposited on both side surface parts of the transparent glass as well as the lower end part of the transparent glass as shown in FIG. 4B.

Referring back to FIG. 2, the folding mirror 120 may reflect a first image onto the first display area 111. At this time, the folding mirror 120 may be implemented as a planar mirror or an aspherical mirror and may reflect a first image to the first display area 111 by adjusting a projection distance and a magnification under control of the control unit 140.

The PGU 130 may directly project the first image to the folding mirror 120 when a PGU operating unit (not shown) is controlled by the control unit 140.

Figure 5:
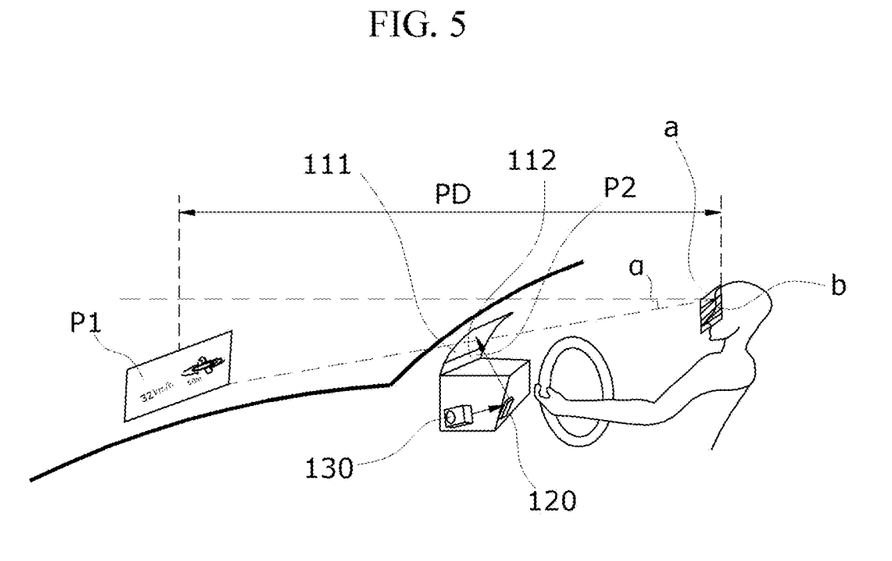
FIG. 5 is an example diagram in which a vehicle head-up display device is implemented according to an embodiment of the present invention.

The folding mirror 120 and the PGU 130 may be arranged and implemented as shown in FIG. 5.

FIG. 5 is an example diagram in which the vehicle head-up display device 100 is implemented according to an embodiment of the present invention.

Under control of the control unit 140, the PGU 130 projects a first image P1, which is an virtual image, and the folding mirror 120 reflects the first image P1 projected by the PGU 130 to the first display area 111.

Thus, the first image P1 may be magnified or reduced according to a viewing angle (a) and a projection distance PD corresponding to a head motion (a) and an eye box (b) of the driver and then may be displayed in the first display area 111.

In this case, driver eye level information such as the viewing angle (a) may be directly received from a driver. For example, eye level information may be automatically detected and then input by an eye level detection device, or eye level information stored in a memory on a driver basis may be withdrawn and then input.

For example, when a viewing angle detected by an eye level detection device is high, that is, when a driver's eye level is high, the control unit 140 may perform a control operation to decrease the height of the first image P1 displayed in the first display area 111. Also, when the driver's viewing angle is low, the control unit 140 may perform a control operation to increase the height of the first image P1 displayed in the first display area 111.

Alternatively, when the control unit 140 cannot control the height of the first image P1 corresponding to the driver's viewing angle, that is, when the driver's head motion and eye box are outside a predetermined range, the control unit 140 may perform a control operation to display information regarding the first image P1 in a second image P2 in order to increase visibility of the first image P1 that provides main information.

Since the first image P1 displayed in the first display area 111 is an virtual image, the driver perceives the first image P1 as being located at a projection distance PD.

Also, a second image P2 is displayed in the second display area 113 implemented by the transparent auxiliary display deposited on the combiner mirror.

Referring back to FIG. 1, the control unit 140 adjusts the projection distance and the magnification and controls the PGU 130 to output the first image to the first display area 111 and to output the second image to the second display area 113.

In this case, the control unit 140 may correct distortion of the first image and then may perform a control operation to output the first image to the first display area 111.

That is, the control unit 140 may adjust the projection distance and the magnification corresponding to the vehicle's speed and may perform a control operation to output the first image to the first display area 111.

To this end, the projection distance and the magnification corresponding to the vehicle's speed may be prestored in the form of a lookup table, and the control unit 140 may adjust the projection distance and the magnification of the first image by controlling the folding mirror 120 with reference to the lookup table.

For example, the projection distance of the first image is a short distance of about 2.5 m or greater, when the vehicle's speed is low, and the projection distance of the first image is a long distance of about 7.5 m or less, when the vehicle's speed is high.

Also, the control unit 140 may combine information regarding a variety of external input content such as cluster vehicle information, an image captured by a camera, etc., select information to be displayed in the first display area 111 and the second display area 113, and then perform a control operation to output the selected information by the first image and the second image.

FIG. 6A to 6D are example diagrams of the first image displayed in the first display area 111 and the second image displayed in the second display area 113.

For example, the control unit 140 may perform selection and control so that main information of a vehicle is to be displayed by a first image and auxiliary information of a vehicle is to be displayed by a second image.

Figure 6A:
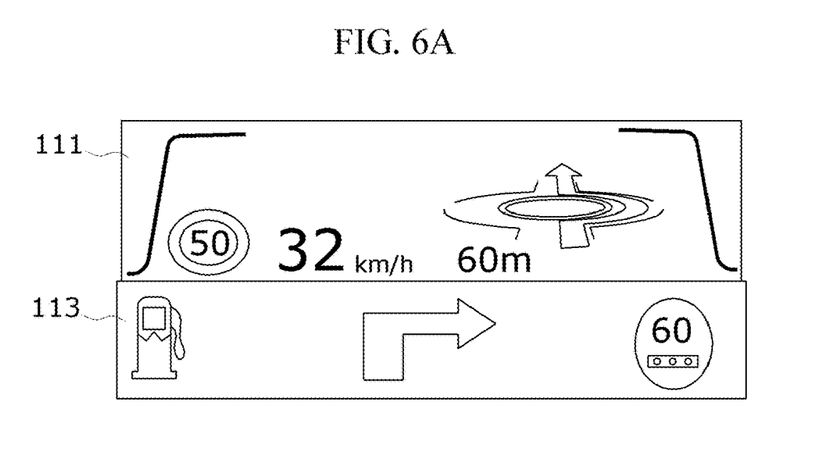
FIG. 6A to 6D are example diagrams of first and second images displayed in first and second display areas.
Figure 6B:
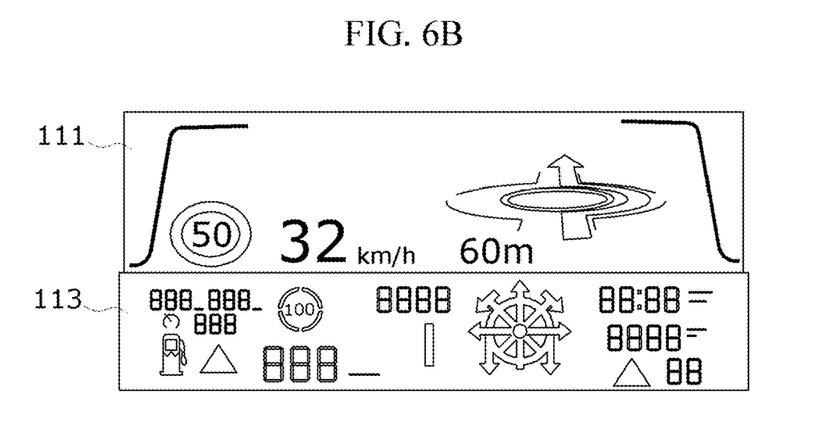

That is, as shown in FIGS. 6A and 6B, driving route information, speed information, and the like may be displayed by the first image, and auxiliary information of a vehicle may be displayed by the second image. In this case, the second display area 113 of the display unit 110 may be implemented by an AM OLED (FIG. 6A) or implemented by a Segment OLED (FIG. 6B) to display the second image.

Figure 6C:
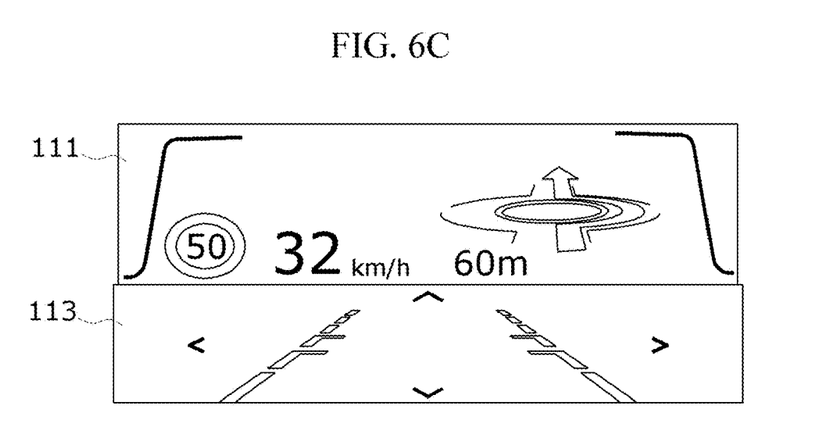
Figure 6D:
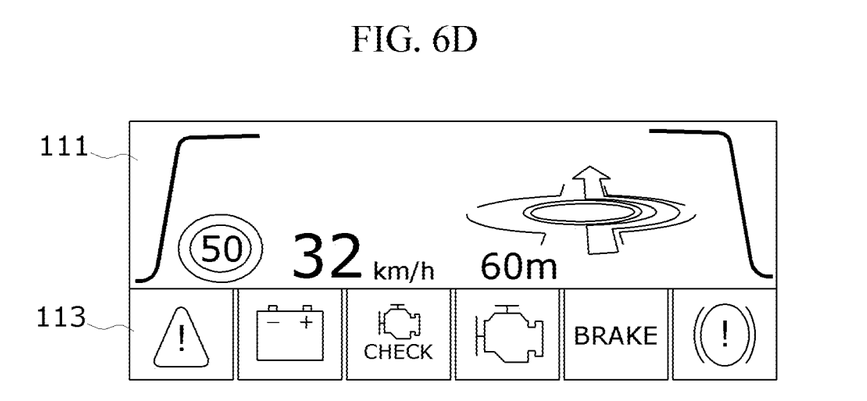

Also, as shown in FIG. 6C, the control unit 140 may perform selection and control so that an image captured by an external camera as shown in FIG. 6C, vehicle warning information displayed in a cluster as shown in FIG. 6D, auxiliary information of the driving route information, auxiliary information of the speed information, and the like are to be displayed by the second image.

However, the information displayed by the first image and the second image is not limited thereto, but may be freely changed by a vehicle's settings. For example, when a vehicle is traveling at low speed or when there is no vehicle ahead, the control unit 140 may perform selection and control so that main information of the vehicle is to be output by a second image.

The control unit 140 may include a communication module (not shown), a memory (not shown), and a processor (not shown).

The communication module may include both a wired communication module and a wireless communication module for transmitting or receiving data to or from a device inside the vehicle. The wired communication module may be implemented by using a power line communication device, a telephone line communication device, a cable home (MoCA), Ethernet, IEEE1294, a unified wire home network, or an RS-485 control device. Also, the wireless communication module may be implemented by using wireless local area network (WLAN), Bluetooth, HDR WPAN, UWB, ZigBee, Impulse Radio, 60-GHz WPAN, binary-CDMA, a wireless USB technique, a wireless HDMI technique, or the like.

More preferably, the communication module may transmit or receive data to or from internal devices of the vehicle through a controller area network (CAN) communication.

A memory stores a program for controlling the head-up display device, and a processor executes a program stored in the memory.

In this case, a memory is collectively referred to as a non-volatile storage device, which maintains stored information even when no power is supplied, and a volatile storage device.

Examples of the memory may include a NAND flash memory such as a compact flash (CF) card, a secure digital (SD) card, a memory stick, a solid-state drive (SSD), or a micro SD card, a magnetic computer memory device such as a hard disk drive (HDD), and an optical disc drive such as a compact disc (CD)-read only memory (ROM) or a digital versatile disc (DVD)-ROM.

The elements illustrated in FIG. 2 according to an embodiment of the present invention may be implemented as software or hardware such as a field programmable gate array (FPGA) or an application specific integrated circuit (ASIC), and may perform predetermined functions.

However, the elements are not limited to software or hardware, and may be configured to be in an addressable storage medium or configured to activate one or more processors.

Accordingly, examples of the elements include elements such as software elements, object-oriented software elements, class elements, and task elements, processes, functions, attributes, procedures, subroutines, program code segments, drivers, firmware, microcode, circuits, data, database, data structures, tables, arrays, and variables.

Elements and functions provided by corresponding elements may be combined to compose a smaller number of elements or may be divided into additional elements.

Figure 7:
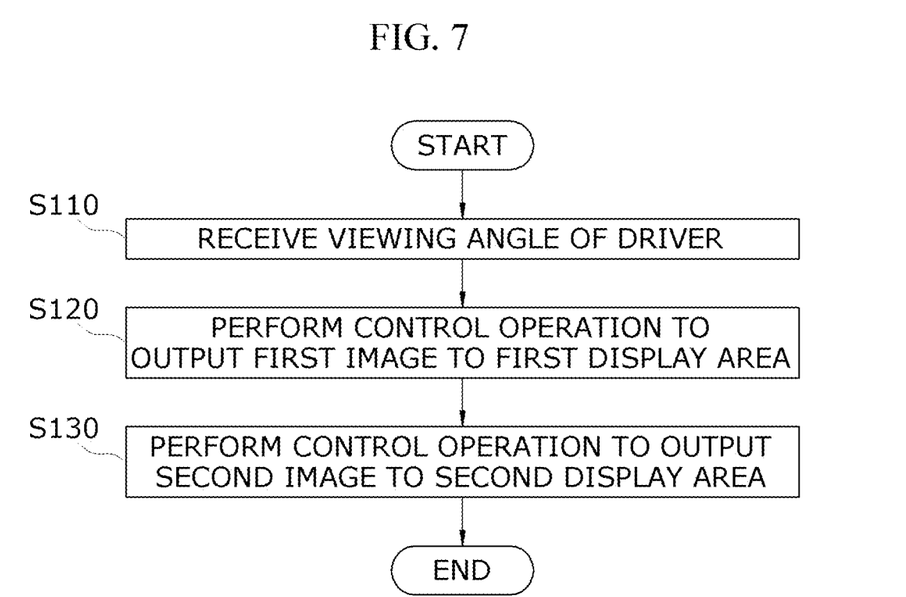
FIG. 7 is a flowchart showing a method of controlling a vehicle head-up display device according to an embodiment of the present invention.

FIG. 7 is a flowchart showing a method of controlling a vehicle head-up display device according to an embodiment of the present invention.

In a method of controlling a vehicle head-up display device according to an embodiment of the present invention, first, a control unit receives a viewing angle corresponding to a head motion and an eye box of a driver (S110).

Subsequently, the control unit adjusts a magnification according to a projection distance and the viewing angle of the driver and performs a control operation to output a first image to a first display area (S120). In this case, the control unit may control a PGU configured to directly project the first image to a folding mirror in order to output the first image to the first display area.

Also, the control unit may adjust the projection distance and the magnification according to a vehicle's speed to perform a control operation to output the first image to the first display area. In this case, the first image may be magnified or reduced according to the viewing angle and the projection distance corresponding to the head motion and the eye box of the driver and then may be displayed in the first display area.

Subsequently, the control unit performs a control operation to output a second image to a second display area (S130).

In this case, the first image is an virtual image, and the second image is an real image.

In the above description, steps S110 to S130 may be divided into additional steps or combined to compose a smaller number of steps depending on the implementation of the present invention. Also, if necessary, some of the steps may be omitted, or the steps may be performed in an order different from that described above. Furthermore, although not described here, the above description with reference to FIGS. 2 to 6D may apply to the control method of FIG. 7.

According to any one of the embodiments of the present invention, by additionally including a transparent auxiliary display that outputs a short-distance real image, it is possible to provide a variety of vehicle information to a driver with minimal eye movement.

Also, by displaying a warning light indication on the second display area 113, it is possible to decrease the number of components through cluster replacement and thus to decrease the weight of a product.

Meanwhile, an embodiment of the present invention may be implemented as a computer program stored in a computer-executable medium or a recording medium including computer-executable instructions. A computer-readable medium may be any available medium accessible by a computer and may include volatile and non-volatile media and discrete and integrated media. Also, a computer-readable medium may include both a computer storage medium and a communication medium. A computer storage medium includes volatile and non-volatile media and discrete and integrated media, which are implemented in any method or technique for storing information such as a computer-readable instruction, a data structure, a program module, or other data. A communication medium includes a computer-readable instruction, a data structure, a program module, other data, e.g., modulated data signals such as subcarriers, or other transmission mechanisms. An example of the communication medium includes any information transfer medium.

While the method and system of the present invention have been described above with respect to specific embodiments, some or all elements or operations of the method and system may be realized by a computer system having a general-purpose hardware architecture.

The above description of the present invention is merely an example. It would be apparent to those of ordinary skill in the art that the present invention may be easily embodied in many different forms without changing the technical idea or essential features thereof. Thus, the above exemplary embodiments are merely examples and the present invention is not limited thereto. For example, elements of the exemplary embodiments described herein as being included in a single device may be dispersed. Similarly, elements of the exemplary embodiments described herein as being dispersed may be combined.

Therefore, the scope of the present invention is defined not by the detailed description but by the following claims, and all changes or modifications within the claims and their equivalents will be construed as being included in the scope of the present invention.

What is claimed is:

1. A vehicle head-up display (HUD) device comprising:
a display unit divided into a first display area and a second display area;
a mirror configured to reflect a first image to the first display area;
a picture generation unit (PGU) configured to project the first image to the mirror; and
a control unit configured to adjust a projection distance and a magnification and control the PGU to output the first image to the first display area and to output a second image to the second display area,
wherein the first image is an virtual image, and the second image is an real image,
wherein the control unit is configured to correct distortion of the first image and then perform a control operation to output the first image to the first display area,
wherein the control unit is configured to adjust a projection distance and a magnification corresponding to a vehicle's speed and perform the control operation to output the first image to the first display area,
wherein the first image is magnified or reduced according to a viewing angle and a projection distance corresponding to a head motion and an eye box of a driver and then is displayed in the first display area.

2. The vehicle HUD device of claim 1,
wherein the display unit is formed by depositing an organic light-emitting diode (OLED) panel on a transparent glass, and
wherein an area of the transparent glass in which the OLED panel is not deposited corresponds to the first display area, and an area of the transparent glass in which the OLED panel is deposited corresponds to the second display area.

3. The vehicle HUD device of claim 2, wherein the OLED panel is deposited on one and more lower end parts and side surface parts of the transparent glass.

4. The vehicle HUD device of claim 1, wherein the projection distance and the magnification corresponding to the vehicle's speed are stored as a lookup table in a memory.

5. The vehicle HUD device of claim 1, further comprising an eye level detection device configured to detect the viewing angle of the driver,
wherein the control unit is configured to adjust the magnification based on the viewing angle of the driver detected by the eye level detection device.

6. The vehicle HUD device of claim 5, wherein when the head motion and the eye box of the driver are determined as being outside a predetermined range, the control unit is configured to perform a control operation to display, by the second image, information displayed by the first image.

7. The vehicle HUD device of claim 1, wherein the viewing angle of the driver is directly received from the driver or is received after viewing angle information stored in a memory on a driver basis is withdrawn.

8. The vehicle HUD device of claim 1, wherein the mirror is a planar mirror or an aspherical mirror.

9. A vehicle head-up display (HUD) device comprising:
a display unit divided into a first display area and a second display area;
a mirror configured to reflect a first image to the first display area;
a picture generation unit (PGU) configured to project the first image to the mirror; and
a control unit configured to adjust a projection distance and a magnification and control the PGU to output the first image to the first display area and to output a second image to the second display area,
wherein the first image is an virtual image, and the second image is an real image,
wherein the first image includes one or both of driving route information and speed information of a vehicle, and the second image includes one or more of an image captured by an external camera, vehicle warning information displayed in a cluster, auxiliary information of the driving route information, and auxiliary information of the speed information.

10. The vehicle HUD device of claim 9, wherein when a vehicle is driving at low speed or when there is no vehicle ahead, the driving route information and speed information of the vehicle of the first image are to be output by the second image.

11. A method of controlling a vehicle head-up display device including a display unit divided into a first display area and a second display area by means of a control unit, the method comprising:
receiving a viewing angle corresponding to a head motion and an eye box of a driver;
adjusting a magnification according to a projection distance and the viewing angle and performing a control operation to output a first image to the first display area; and
performing a control operation to output a second image to the second display area,
wherein the first image is an virtual image, and the second image is an real image.

12. The method of claim 11, wherein the performing of a control operation to output a first image to the first display area comprises controlling a picture generation unit (PGU) configured to directly project the first image to a folding mirror in order to output the first image to the first display area.

13. The method of claim 11, wherein the performing of a control operation to output a first image to the first display area comprises adjusting a magnification and a projection distance corresponding to a vehicle's speed and performing a control operation to output the first image to the first display area.

14. The method of claim 13, wherein the first image is magnified or reduced according to the viewing angle and the projection distance corresponding to the head motion and the eye box of the driver and then is displayed in the first display area.

* * * * *